United States Patent [19]
Kitahara

[11] Patent Number: 5,837,963
[45] Date of Patent: Nov. 17, 1998

[54] METHOD OF MANUFACTURING A THIN FILM MAGNETIC HEAD WITH IDENTIFICATION MARKS

[75] Inventor: Yoshimi Kitahara, Saku, Japan

[73] Assignee: TDK Corporation, Tokyo, Japan

[21] Appl. No.: 862,440

[22] Filed: May 23, 1997

Related U.S. Application Data

[62] Division of Ser. No. 680,621, Jul. 17, 1996, Pat. No. 5,721,651.

[30] Foreign Application Priority Data

Aug. 2, 1995 [JP] Japan .................................... 7-215461

[51] Int. Cl.⁶ ............................. B23K 26/00; G11B 5/60
[52] U.S. Cl. ...................................................... 219/121.69
[58] Field of Search ...................... 219/121.68, 121.69; 427/555; 29/603.07, 603.12, 603.15

[56] References Cited

U.S. PATENT DOCUMENTS

| | | | |
|---|---|---|---|
| 4,301,353 | 11/1981 | Suenaga et al. | 219/121.68 |
| 5,329,090 | 7/1994 | Woelki et al. | 219/121.68 |
| 5,523,125 | 6/1996 | Kennedy et al. | 427/555 |
| 5,718,036 | 2/1998 | Oji et al. | 219/121.68 |

FOREIGN PATENT DOCUMENTS

| | | |
|---|---|---|
| 62-20116 | 1/1987 | Japan . |
| 62-20117 | 1/1987 | Japan . |
| 62-20118 | 1/1987 | Japan . |
| 2-10712 | 1/1990 | Japan ..................................... 427/555 |
| 4-71792 | 3/1992 | Japan ............................... 219/121.68 |
| 4-102214 | 4/1992 | Japan . |
| 4-352314 | 12/1992 | Japan . |
| 5-311394 | 11/1993 | Japan ..................................... 427/555 |
| 2 262 839 | 12/1992 | United Kingdom . |
| 2262839 | 6/1993 | United Kingdom . |
| 2 287 353 | 2/1995 | United Kingdom . |
| 2287353 | 9/1995 | United Kingdom . |

*Primary Examiner*—Geoffrey S. Evans
*Attorney, Agent, or Firm*—Collard & Roe, P.C.

[57] ABSTRACT

A method of manufacturing thin film magnetic heads, including the steps of forming, on one surface of a substrate, a plurality of electromagnetic transducer elements and a plurality of input and output terminals electrically connected to the transducer elements, forming a protection layer on the surface of the substrate to cover at least the transducer elements, forming terminal cover layers and a seed layer thereof on the surface in order to cover the input and output terminals, respectively, and forming identification marks for identifying the magnetic head on the protection layer by laser beam machining. The identification mark forming step is performed during the terminal cover layer forming step.

10 Claims, 15 Drawing Sheets

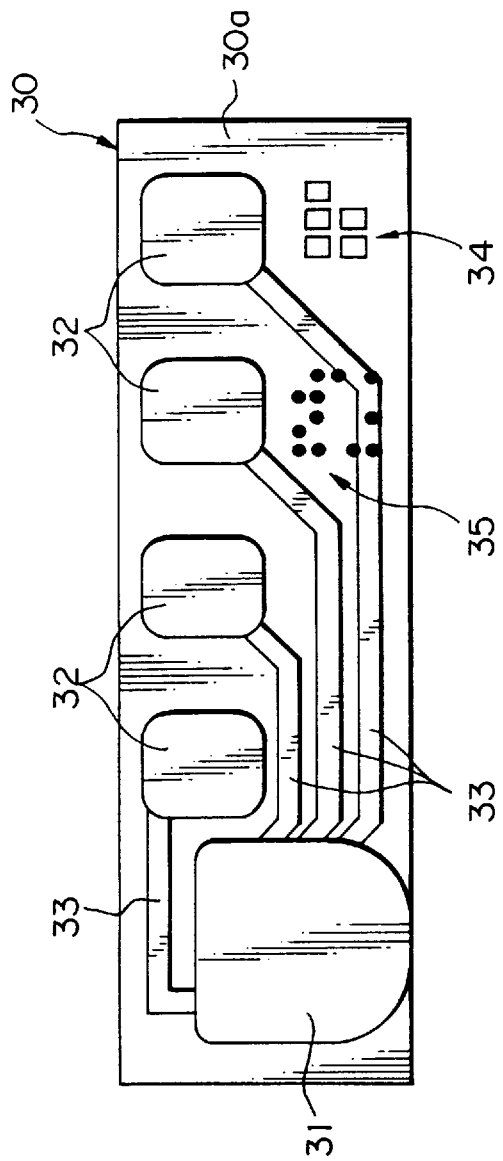

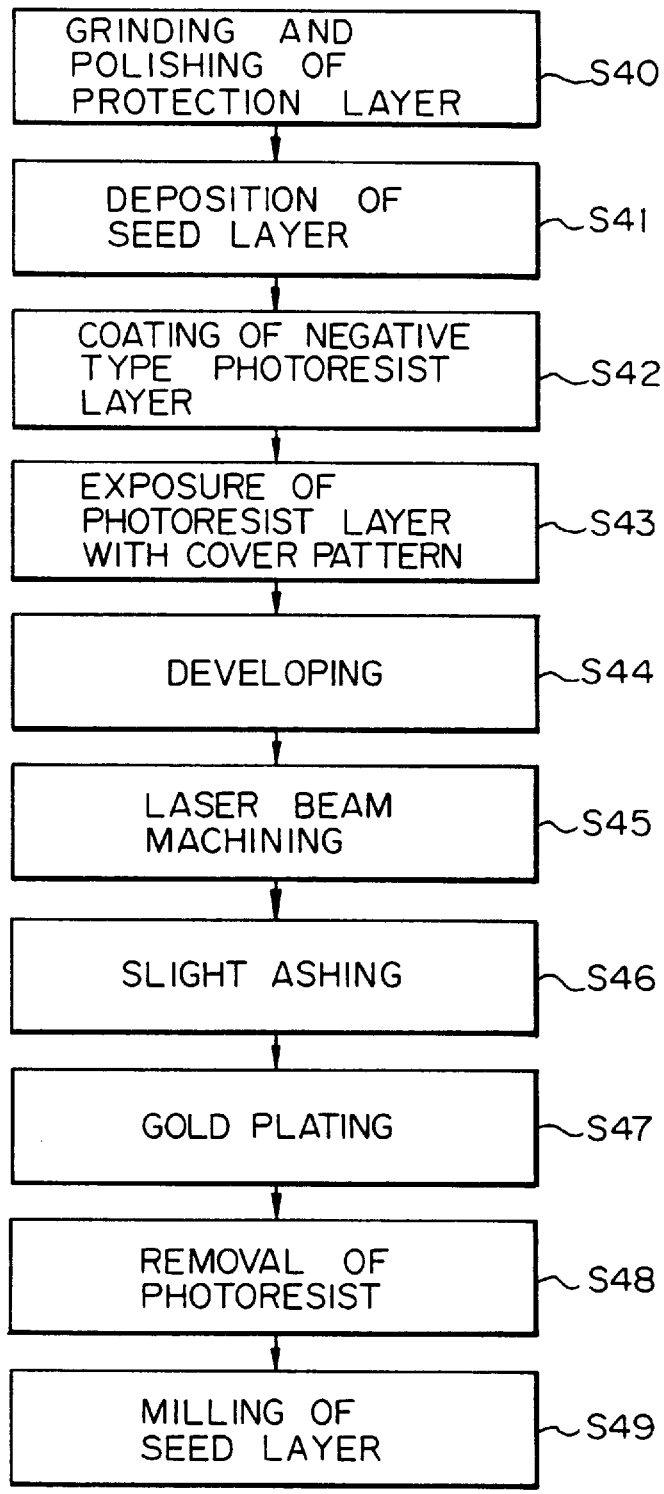

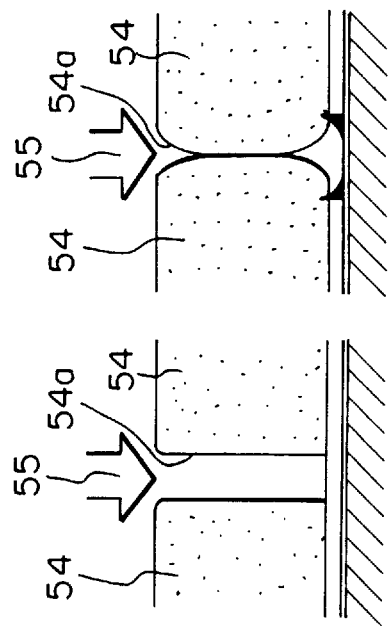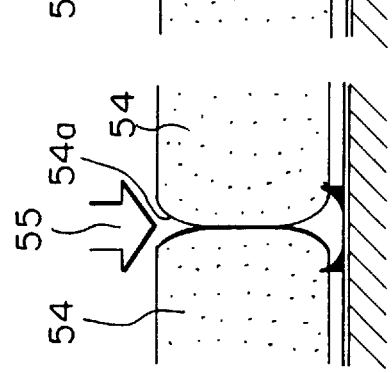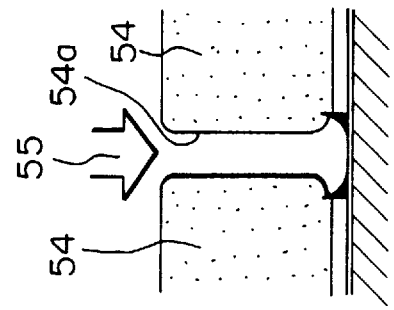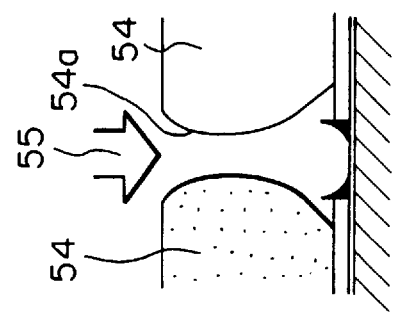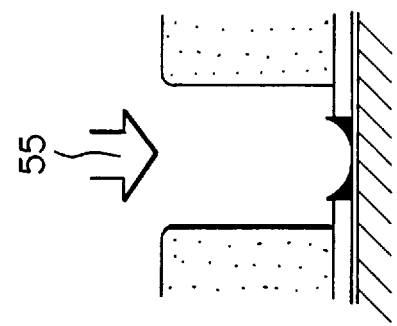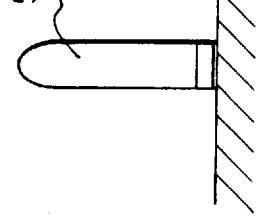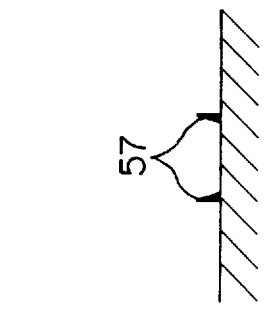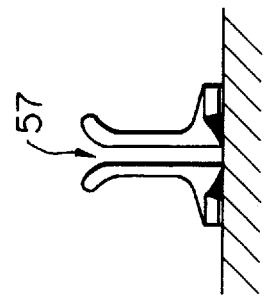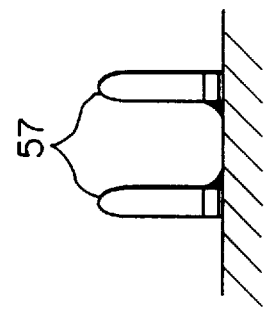

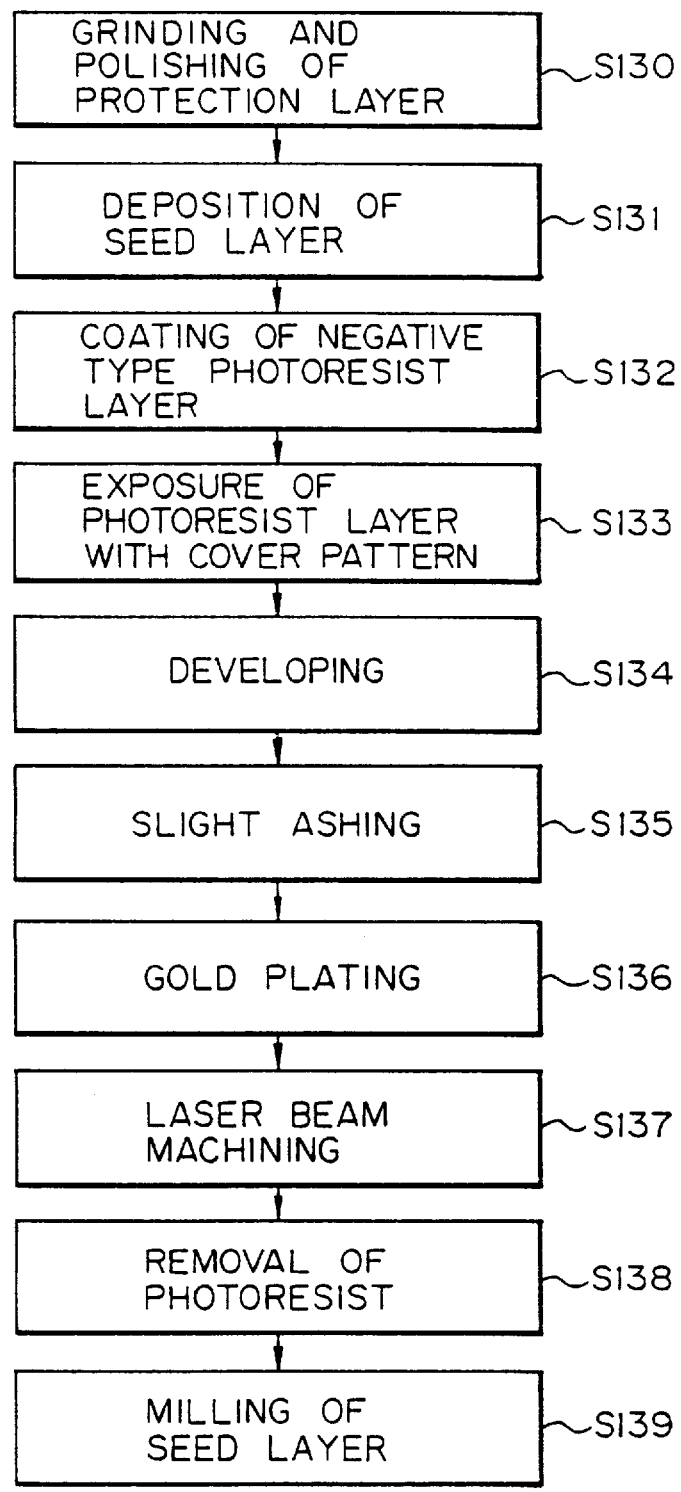

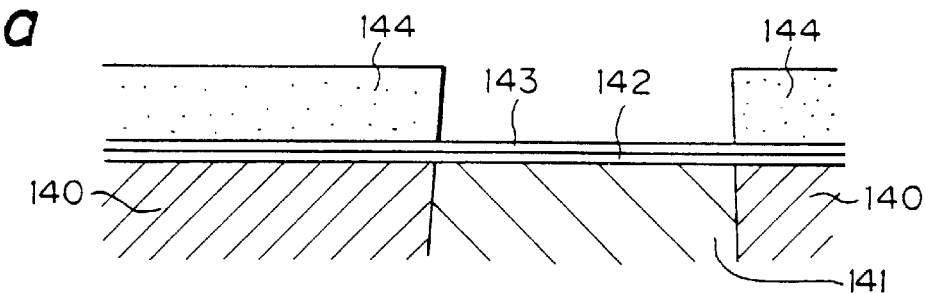
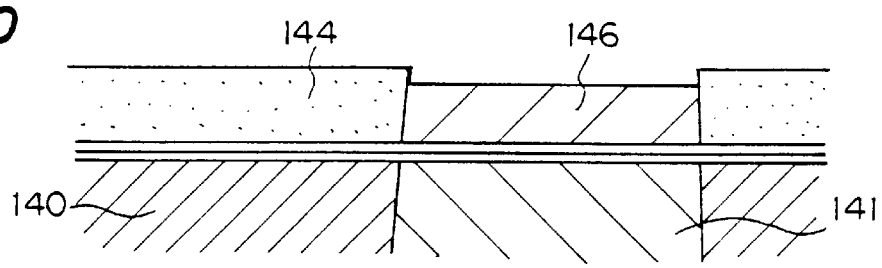
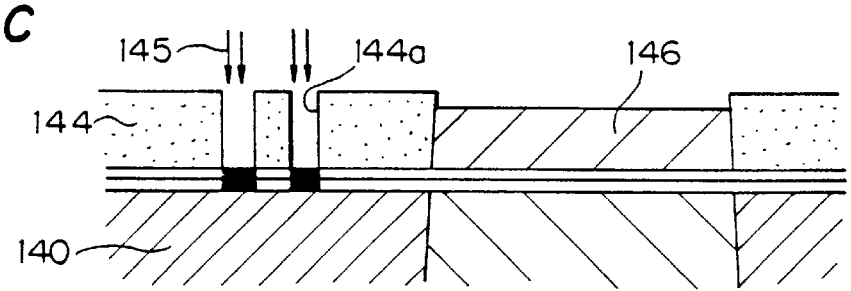
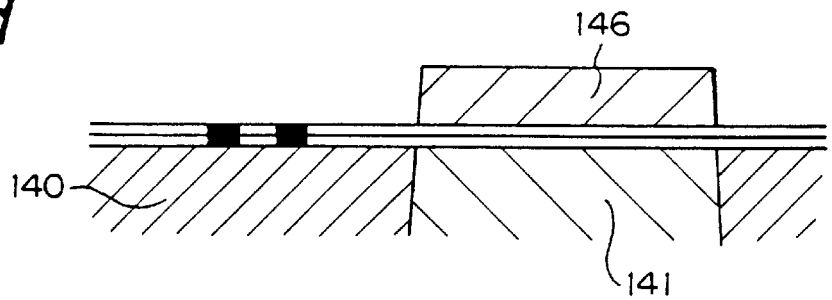
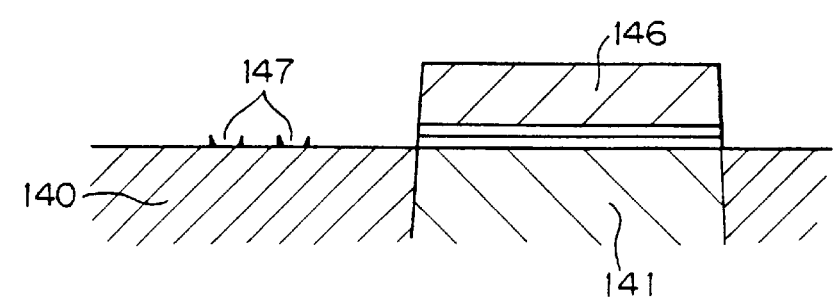

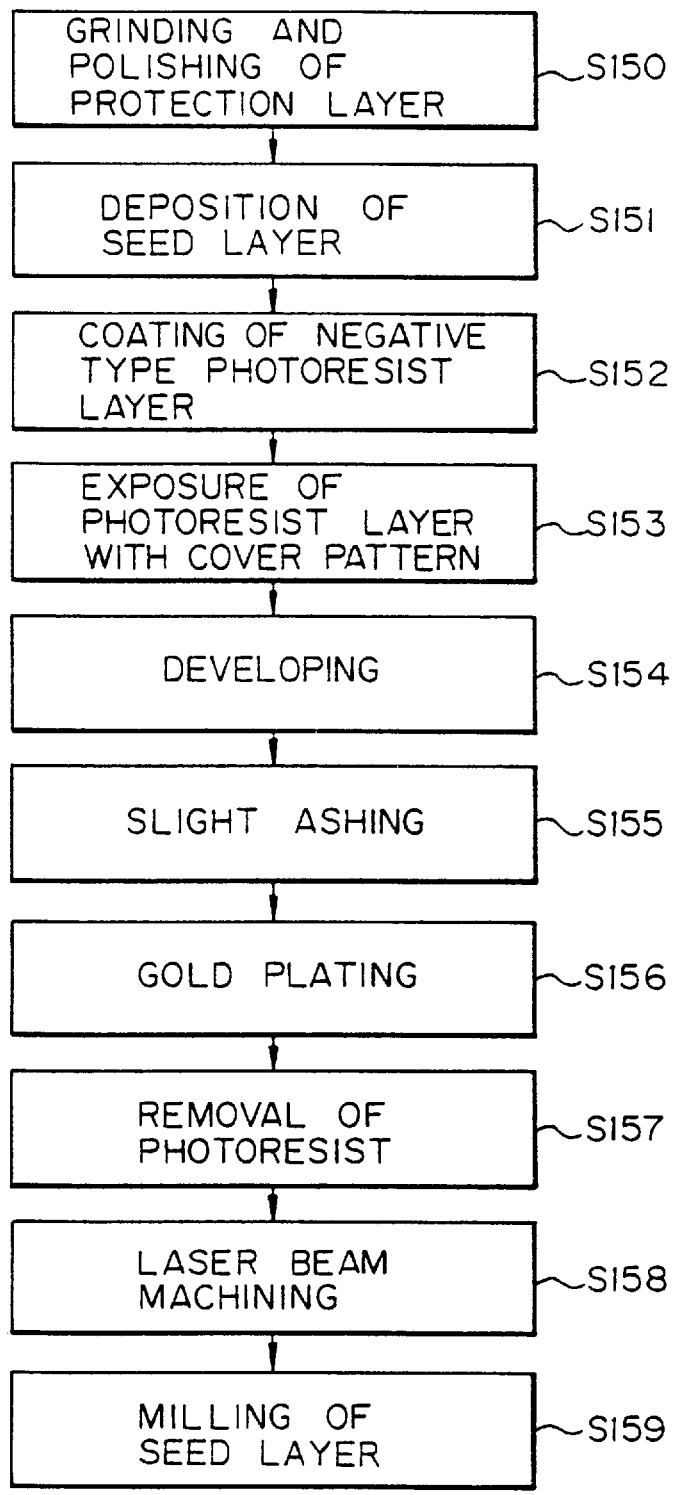

METHOD OF MANUFACTURING A THIN FILM MAGNETIC HEAD WITH IDENTIFICATION MARKS

"This is a divisional of application Ser. No. 08/680,621 filed on Jul. 17, 1996, now U.S. Pat. No. 5,721,651."

FIELD OF THE INVENTION

The present invention relates to a thin film magnetic head fabricated by simultaneously forming a plurality of head elements on a single substrate and then by cutting the substrate to separate the formed respective head elements, and also relates to a method of manufacturing the same.

Description of the Related Art

Thin film magnetic heads are in general fabricated by using a photolithography technology, a thin film forming technology, an etching technology and a grinding and polishing technology. On a substrate (wafer), a matrix of magnetic head elements (electromagnetic transducer elements) and their input and output terminals are simultaneously formed. Then, the substrate is cut into a plurality of rectangular sliced blocks (bars) so that each of the bars includes a plurality of magnetic head elements and of input and output terminals aligned in a single-row. Thereafter, one surface of each of the bars is subjected to grinding and polishing processes to shape rails and air bearing surfaces of the sliders, and then, by cutting the bar, individual magnetic heads are finally obtained.

Each lot of fabricating thin film magnetic heads is in general determined to a unit corresponding to a single substrate (wafer) or a plurality of substrates (wafers). Since the above-mentioned processes are repeated at every lot, there may be some differences in sizes and/or in characteristics between the manufactured heads from the same substrate, between the manufactured heads from the different substrates in the same lot, or between the manufactured heads from the different lots. Also, some defective heads may be included in the manufactured magnetic heads from the same substrate, in the manufactured heads from the different substrates in the same lot, or in the manufactured heads from the different lots.

Accordingly, in order to manage and to control the manufacturing processes so as to prevent defective heads from increasing, it is necessary to provide for each magnetic head an identification number or symbol which indicates a location of the head in a substrate, a location of the substrate in a lot, and/or a lot number. The identification numbers or symbols of the respective magnetic heads will be required for managing the heads at a cutting process in which the bar will be separated into individual magnetic heads and for adequately eliminating the defective heads.

Japanese Patent Unexamined Publication No. 62(1987)-20116 discloses a conventional art for providing such identification numbers or symbols to a thin film magnetic head. In this known art, the magnetic head has an identification number written, using a photolithography technology, within an unoccupied area on an element-formed face of the head as shown in FIG. 1. This identification number was written, before cutting the substrate into bars, on its front surface. The magnetic head also has an identification number written, by a laser beam machining, on an opposite face of the element-formed face (air-flow intake side face of the slider) as shown in FIG. 2. This identification number was written, before cutting the substrate into bars, on its rear surface.

In these FIGS. 1 and 2, reference numeral 10 denotes a slider of the thin film magnetic head, 11 and 12 denote electromagnetic transducer elements and input and output terminals which are formed on an air-flow outlet side face 10a of the slider 10, respectively. In the first layer of this end face 10a, an identification number 13 is written by photolithography, and also an identification number 14 is written, by a laser beam machining, on an air-flow intake side face 10b of the slider 10. These identification numbers 13 and 14 are the same number which indicates a location of the magnetic head in a substrate.

Japanese Patent Unexamined Publication No. 4(1992)-102214 discloses an another conventional art for providing an identification number or symbol to a thin film magnetic head. In this latter known art, an identification number is written, using a photolithography technology or a laser beam machining technology, on an air-flow intake side face of the slider. This identification number was written, before cutting the substrate into bars, on its rear surface. The identification number in this case is information for indicating a location of the magnetic head in the substrate, identifying the substrate itself and indicating specification of the head.

The above-mentioned conventional arts however have following problems.

(1) According to the conventional art for forming an identification number or symbol in a first layer on an air-flow outlet side face of the slider (on a front surface of the substrate) by photolithography, since the identification number or symbol has to be written within an area unoccupied by electromagnetic transducer elements and input and output terminals which are formed on this same face, a large amount of identification number cannot be written. Particularly, since recent thin film magnetic heads for high recording density have been greatly downsized, an unoccupied area on an element-formed face of each of the heads becomes extremely small causing the amount of identification number which can be written thereon to extremely reduce.

(2) The another conventional art for forming an identification number or symbol on a rear surface of the substrate cannot be used in a certain method for manufacturing a thin film magnetic head, in which a portion of the substrate near the rear surface is sliced and removed after the identification number or symbol is formed. For example, in a manufacturing method proposed in U.S. patent application Ser. No. 08/595,923 according to the same assignee as that of this application, a substrate with a thickness more than a desired slider length is used for forming the electromagnetic transducer elements and after that a portion of the substrate near the rear surface is sliced and removed so that a length of the substrate becomes equal to the desired slider length. This method can prevent a possible bend toward the substrate thickness to occur resulting no defective sliders in dimension due to this direction bend in spite of downsizing of the slider. In such case, of course, the identification number or symbol formed on the rear surface of the substrate will be lost at the slicing and removing process.

SUMMARY OF THE INVENTION

It is therefore an object of the present invention to provide a thin film magnetic head and a method of manufacturing the head, whereby enough amount of identification information of the head can be formed in spite of downsizing.

Another object of the present invention is to provide a thin film magnetic head and a method of manufacturing the head, whereby identification information of the head can be held even if a portion of the substrate near its rear surface is sliced and removed during the manufacturing processes.

Further object of the present invention is to provide a thin film magnetic head and a method of manufacturing the head, whereby identification information of the head can be formed without greatly modifying the conventional manufacturing processes.

The present invention relates to a thin film magnetic head which is one of a plurality of thin film magnetic heads produced from a single substrate. This magnetic head includes a slider with at least one end face, at least one electromagnetic transducer element formed on the end face of the slider, a plurality of input and output terminals formed on the end face of the slider and electrically connected to the transducer element, a protection layer formed on the end face to cover at least the transducer element, and an identification mark for identifying the magnetic head, described on the protection layer on the end face of the slider.

Since the identification mark is formed on the protection layer, this identification mark can be made in any region on the end face so long as presence of the protection layer. Namely, the identification mark can be made even on the transducer element and lead conductors which connect the transducer with the input and output terminals. Thus, enough amount of identification information can be described on the end face even if the thin film magnetic head is greatly downsized.

Also, according to the present invention, to form the identification mark on the protection layer will result no modification of process conditions in a protection layer forming process which may be one of the most difficult manufacturing processes of the thin film magnetic head. Therefore, the formation process of the identification mark can be very easily introduced into the manufacturing processes of the magnetic head.

Furthermore, since the identification mark is formed on the element-forming face of the slider, the identification marks can be held even if a portion of the substrate near its rear surface is sliced and removed due to downsizing.

It is preferred that the identification mark represents an identifying information which can differ for each substrate, such as at least one of information for identifying a location the substrate in a lot and information for identifying a lot location.

It is also preferred that the identification mark is described by the same material as that of the terminal cover layers (bump cover layers) and/or a seed layer thereof deposited on the input and output terminals (bumps). In a process for forming the bump cover layers of the bumps, at first, the seed layer for the bump cover layers is deposited on the protection layer. The identification mark can be made by applying the laser beam to the seed layer or to the bump cover layers itself so as to machine it to remain irradiation traces of the material of the seed layer or to the bump cover layers on the protection layer.

Preferably, the identification mark is formed in a region outside of the input and output terminals. Since input and output wires will be connected to the terminals, it is desired the mark is formed in the outside region of these terminals.

It is preferred that the identification mark is represented by spots of a binary code such as a BCD code. If the binary code is used instead of characters and numerals, larger amount of the information can be written in a smaller area. Using of the binary code is also effective for making very easy the laser beam machining process of the identification mark because it can be represented by spots.

According to the present invention, also a method of manufacturing thin film magnetic heads including a step of forming, on one surface of a substrate, a plurality of electromagnetic transducer elements and a plurality of input and output terminals electrically connected to the transducer elements, a step of forming a protection layer on the surface of the substrate to cover at least the transducer elements, and a step of forming identification marks for identifying the respective magnetic head, on the protection layer on the surface of the substrate by means of laser beam machining is provided.

Since the identification mark is formed on the protection layer, this identification mark can be made in any region outside of the bumps. Namely, the identification mark can be made even on the transducer elements and on the lead conductors. Thus, enough amount of identification information can be written even if the thin film magnetic head is greatly downsized. Furthermore, since the identification marks are formed on the element-forming face of the substrate, these identification marks can be held even if a portion of the wafer near its rear surface is sliced and removed due to downsizing. Therefore, management of each of magnetic heads is possible in any manufacturing processes after the aforementioned bump cover forming process. Laser beam machining of the identification marks can result usage of no photomask and easy formation of arbitrary marks. Also, as precise location of the identification marks will not be required, a low cost laser can be used.

It is very preferred that the identification mark forming step includes a step of forming identifying information which can differ for each substrate by means of laser beam machining.

In order to make the identification mark by photolithograph as in the conventional art, it is necessary to use a photomask. Although the same photomask can be commonly used for making an identification mark representing a slider identifying information such as a location information of the slider in a substrate, different photomasks for respective substrates or lots should be used for making an identification mark representing substrate identifying information such as a location information of the substrate in a lot or a lot number. Thus, a great number of the photomasks has to be prepared. However, the laser beam machining of the identification marks can result usage of no photomask and easy formation of arbitrary marks such as an identification mark representing substrate identifying information such as a location information of the substrate in a lot or a lot number without increasing a number of the photomask.

It is also preferred that the method further includes a terminal cover forming step of forming terminal cover layers and a seed layer thereof on the surface in order to cover the input and output terminals, respectively, and that the identification mark forming step is performed during this terminal cover layer forming step.

Since the seed layer of such as titanium and gold acts as a layer for laser beam reflection and absorption, for laser beam scattering and for heat absorption, the transducer elements and lead conductors formed below this seed layer are protected from destructions caused by metal fusion or boundary face stripping due to the laser beam striking through the protection layer which is in general formed by a material easily transmitting the laser beam. To form the identification mark on the protection layer results no modification of process conditions in a conventional process. Therefore, the formation process of the identification mark can be very easily introduced into the manufacturing processes of the magnetic head.

Preferably, the identification mark forming step includes a step of forming the identification marks in regions outside of the input and output terminals. Since input and output wires will be connected to the terminals, it is desired the mark is formed in the outside region of these terminals.

It is preferred that the terminal cover layer forming step includes a step of forming a seed layer on the protection layer, and a step of plating gold on the seed layer to make the terminal cover layers, and that the identification mark forming step includes a step of forming identification marks on the seed layer by means of laser beam machining.

In this case, the identification mark forming step may include a step of applying laser beam to the seed layer through a deposited photoresist layer. If the laser beam machining is performed after depositing the photoresist layer for the gold plating, dross which is certainly produced by the laser beam machining will be absorbed by this photoresist layer to suppress its scattering. Also, since the produced dross can be removed together with the photoresist layer , the electromagnetic transducer elements will be effectively prevented from contamination. Furthermore, the photoresist layer contributes to absorption of heat produced by the laser beam.

The identification mark forming step may be carried out after or before the gold plating step. If it is carried out after the gold plating step, the dross due to the laser beam machining will produce no effect on this gold plating of the bump cover layers.

The method may further include a step of removing the photoresist layer, and the identification mark forming step may be carried out after or before the photoresist layer removing step.

It is preferred that the terminal cover layer forming step includes a step of forming a gold cover layer on the protection layer by sputtering, and a step of making a predetermined patterns of the gold cover layer, and that the identification mark forming step includes a step of forming identification marks on the patterned gold cover layer by means of laser beam machining.

Further objects and advantages of the present invention will be apparent from the following description of the preferred embodiments of the invention as illustrated in the accompanying drawings.

BRIEF DESCRIPTION OF THE DRAWINGS

FIG. 3 is a plane view schematically showing an air-flow outlet side face of a preferred embodiment of a thin film magnetic head according to the present invention;

FIG. 4 is a flow chart of a bump cover forming process of a method of manufacturing a thin film magnetic head according to the present invention;

FIGS. 7a and 7b are sectional views respectively showing a process of the laser beam machining and a shape of a finally obtained identification mark;

FIGS. 8a and 8b are sectional views respectively showing a process of the laser beam machining and a shape of a finally obtained identification mark; FIGS. 9a and 9b are sectional views respectively showing a process of the laser beam machining and a shape of a finally obtained identification mark;

FIGs. 10a and 10b are sectional views respectively showing a process of the laser beam machining and a shape of a finally obtained identification mark;

FIGs. 11a and 11b are sectional views respectively showing a process of the laser beam machining and a shape of a finally obtained identification mark;

FIG. 13 is a flow chart of an another bump cover forming process of a method of manufacturing a thin film magnetic head according to the present invention;

FIGS. 14a to 14e are wafer sectional views illustrating the process of FIG. 13;

FIG. 15 is a flow chart of a further bump cover forming process of a method of manufacturing a thin film magnetic head according to the present invention;

DESCRIPTION OF THE PREFERRED EMBODIMENTS

Figure 1:
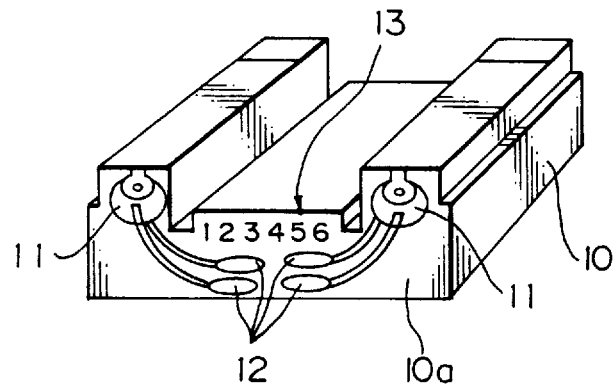
FIG. 1, already described, shows the conventional art for forming identification number or symbol on a thin film magnetic head.
Figure 2:
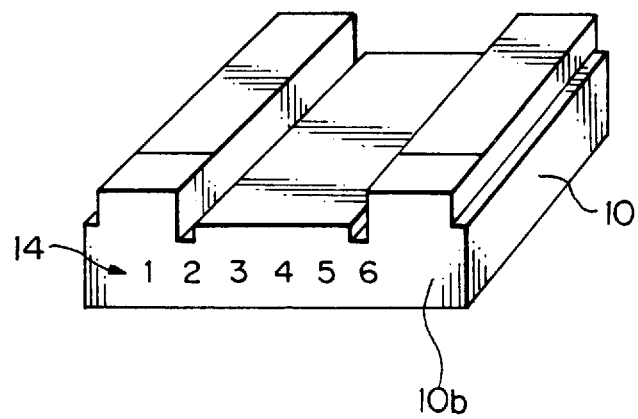
FIG. 2, already described, shows the conventional art for forming identification number or symbol on a thin film magnetic head.

In FIG. 3 which schematically shows an air-flow outlet side face of a preferred embodiment of a thin film magnetic head according to the present invention, reference numeral 30 denotes a slider and 30a denotes an air-flow outlet side face of the slider 30. On this end face 30a, an electromagnetic transducer element or a read/write magnetic head element 31, its input and output terminals (bumps) 32 and lead conductors 33 electrically connecting the transducer element 31 with the bumps 32 are formed by using a photolithography technology, a thin film forming technology and an etching technology for example.

In a portion on the end face 30a, which is not occupied by the transducer element 31, the bumps 32 and the lead conductors 33, a first identification mark 34 represented by numerals, characters or binary codes is formed. This first identification mark 34 is a slider identifying information which indicates a location of the slider 30 in the substrate (wafer) such as for example a bar number and/or a piece number of this slider. The same mark 34 will be written for the sliders at the same location in different wafers. This mark 34 can be formed by photolithography using a common photomask for different wafers.

As is not clearly illustrated in FIG. 3, whole area of the end face 30a of the completed head except for regions of the bumps 32 is covered by a protection layer. On the protection layer, a second identification mark 35 is formed as irradiation traces by means of laser beam. This mark 35 is a wafer identifying information which indicates for example a location of the wafer in a lot and/or a lot number and which can be differ for each wafer. This mark 35 may be not the same for different wafers.

This second identification mark 35 is made of a material forming terminal cover layers for covering the respective bumps 32 (bump cover layers) or a material of a seed layer of the bump cover layers. In a process for forming the bump cover layers of the bumps 32, at first, the seed layer for the bump cover layers, made of materials of for example gold and titanium is deposited. As will be described later in detail, the second identification mark 35 is made by applying the laser beam to the seed layer or to the bump cover layers itself so as to machine it to remain irradiation traces of gold and titanium on the protection layer.

Since the second identification mark 35 is formed on the protection layer, this identification mark 35 can be made in any region on the end face 30a so long as presence of the protection layer. Namely, the second identification mark 35 can be made even on the transducer element 31 and the lead conductors 33. Thus, enough amount of identification information can be written on the end face 30a even if the thin film magnetic head is greatly downsized. It is desired that the second identification mark is formed outside of the bumps 32 because input and output wires will be connected thereto. However, if there are remained areas in the bumps 32 after the connection of the input and output wires, the second identification mark may be written on the remained areas within the bumps 32. To form the second identification mark 35 on the protection layer will result no modification of process conditions in a protection layer deposition process which may be one of the most difficult manufacturing processes of the thin film magnetic head. Therefore, the formation process of the second identification mark can be very easily introduced into the manufacturing processes of the magnetic head.

Furthermore, since the identification marks 34 and 35 are formed on the element-forming face 30a of the slider 30 (on the front surface of the substrate), these identification marks can be held even if a portion of the substrate near its rear surface is sliced and removed due to downsizing.

The second identification mark 35 is, in this embodiment, represented by BCD (Binary-Coded Decimal) code. However, this second identification mark 35 can be represented either by a binary code other than the BCD code or by characters and/or numerals. If the binary code is used instead of characters and numerals, larger amount of the information can be written in a smaller area. Using of the binary code is also effective for making very easy the laser beam machining process of the second identification mark 35 because it can be represented by spots. In order to represent the second identification mark 35 by the binary code of spots arranged in a matrix (for example five lines and five columns), it may be necessary to know which is the top side or bottom side of the matrix. For this purpose, it may be determined that spots at predetermined positions in the matrix (for example spots at fourth line and second column, at fifth line and second column, at fifth line and third column, and at fifth line and fourth column) are always existed so that these spots are used as a symbol for indicating the top side or bottom side of the matrix.

In the aforementioned embodiment, only the second identification mark which indicates wafer identifying information is formed by the laser beam machining. However, a first identification mark indicating a location of the wafer or another information indicating for example specification of the head can be formed by the laser beam machining.

FIG. 4 shows a bump cover forming process of a method of manufacturing a thin film magnetic head according to the present invention, and FIGS. 5a to 5e sectionally show the process of FIG. 4. Hereinafter, referring to these figures, the bump cover forming process will be described in detail.

On a front surface (element-forming face) of a wafer, a plurality of electromagnetic transducers, a plurality of bumps made of for example copper, and a plurality of lead conductors electrically connecting the transducers with the respective bumps, such as shown in FIG. 3 are formed and after that a protection layer is formed thereon, in accordance with the known processes.

In the bump cover forming process carried out after these processes, at first, the protection layer 50 is ground and polished to bare a surface of the bumps 51 (step S40).

Then, as a seed layer for gold (or platinum) plating which constitutes the bump cover, a titanium layer 52 and a gold layer 53 are sequentially deposited on the ground protection layer 50 and on the bared bumps 51 by sputtering for example (step S41). Thicknesses of the deposited titanium layer 52 and the deposited gold layer 53 are for example 50 Angstroms and 500 Angstroms, respectively. The titanium layer 52 serves as an adhesive layer which may be made by chrome or tantalum other than titanium.

Figure 5A:
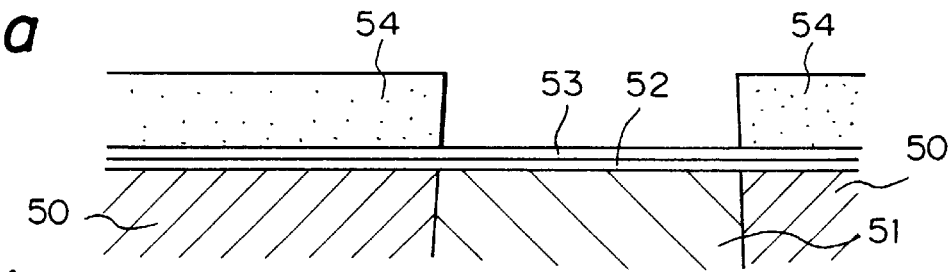
FIGS. 5a to 5e are wafer sectional views illustrating the process of FIG. 4.

On the seed layer 53, a negative type photoresist layer 54 is coated (step S42). This coated photoresist layer 54 is then exposed to for example ultraviolet radiation with a mask having a predetermined bump cover pattern (step S43) and developed (step S44) so as to obtain a layer structure as shown in FIG. 5a.

Figure 5B:
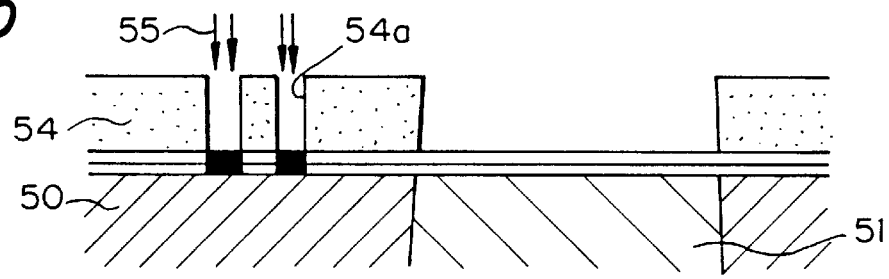

Then, laser beams 55 are radiated to the photoresist layer 54 which is formed on the seed layer except for the regions of the bumps 51, to machine a part of the photoresist layer 54 and the seed layer 52, 53 so that an identification mark such as the second identification mark 35 shown in FIG. 3, which indicates wafer identifying information (for example a location information of the wafer in a lot or a lot number), by a binary code such as a BCD code (step S45). Namely, as shown in FIG. 5b, each laser beam 55 makes a hole 54a in the photoresist layer 54 and changes properties of the seed layer 52, 53 of a circular portion under the hole 54a. In case that YAG laser beam with a spot diameter of 10 $\mu$m is radiated to the negative type photoresist layer 54, the hole 54a with an internal diameter of 0–8 $\mu$m is made in the photoresist layer 54 and also the properties of titanium and gold of the seed layer 52, 53 within the circular portion with a diameter of 16 $\mu$m is changed.

Figure 6:
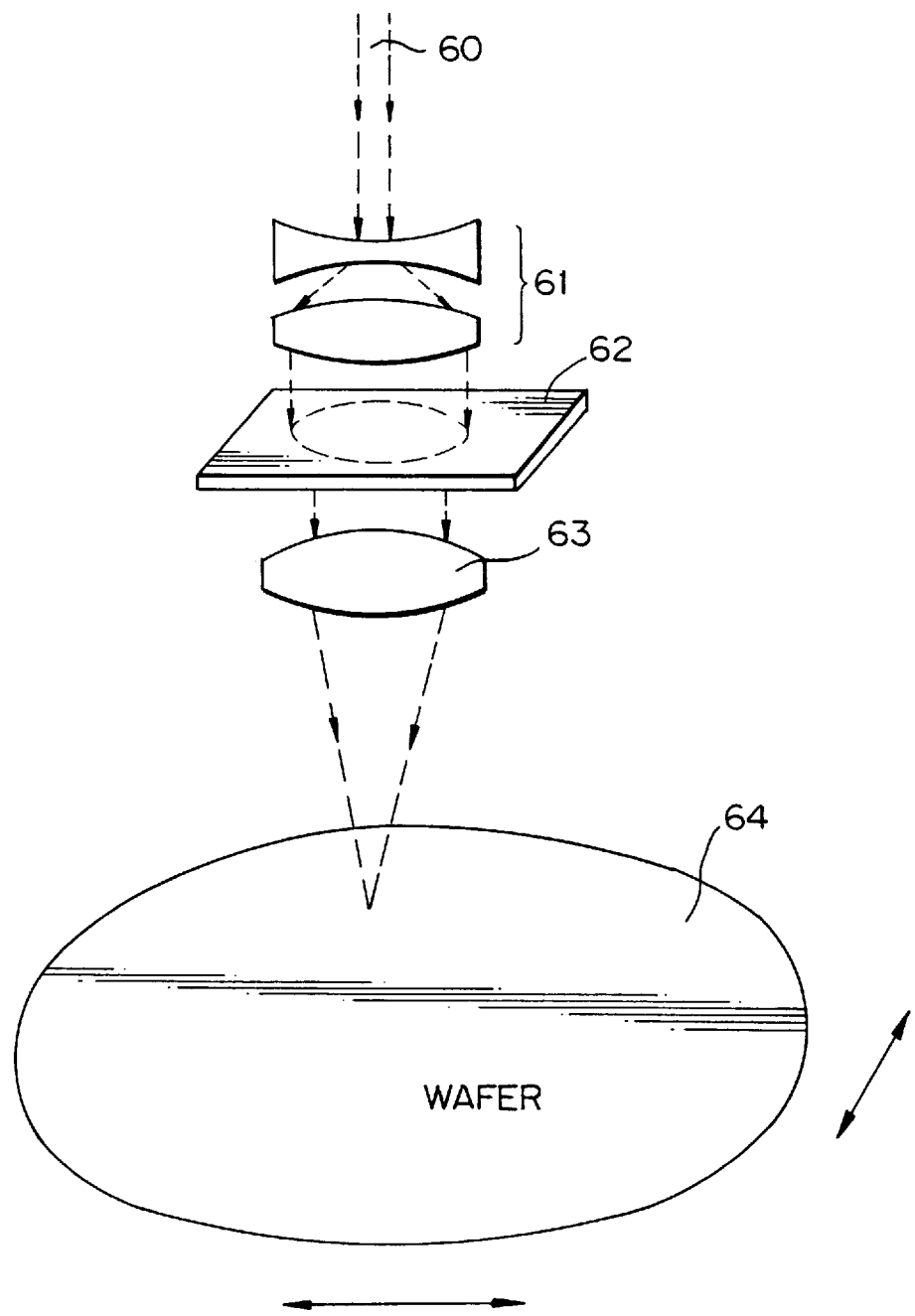
FIG. 6 is a schematic view showing an example of a laser beam machine used for a laser beam machining process.

FIG. 6 shows an example of a laser beam machine used for this laser beam machining process. In the figure, reference numeral 60 denotes a YAG laser beam with a diameter of 1.2 mm, 61 denotes a beam expander, 62 denotes a programmable data mask, 63 denotes a reduction lens, and 64 denotes a wafer which is positioning controlled along longitudinal and lateral axes, respectively. Another general type laser beam machines such as a scanning type laser beam machine using a galvanomirror or a polygon mirror may be used for this laser beam machining process other than the mask reduced projection type laser beam machine shown in FIG. 6.

Figure 5C:
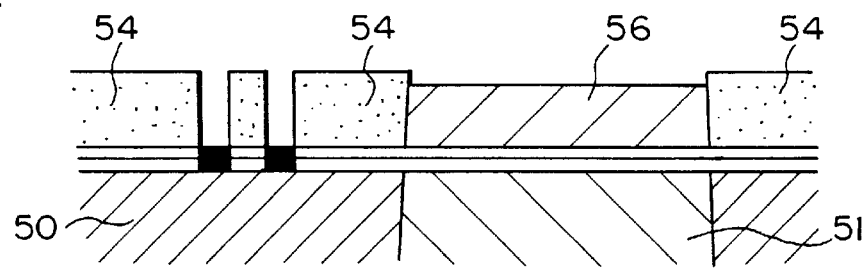

After the laser beam machining process, the wafer is subjected to a slight ashing process (step S46). As a result, the surface of the seed layer 53 at the regions of the bumps 51 is purified, the diameter of the holes 54a is increased by 1–2 $\mu$m, and also the properties-changed portions around the holes 54a are eliminated. Thereafter, gold plating is performed (step S47). Thus, terminal cover layers (bump cover layers) made of gold 56 are formed as shown in FIG. 5c. If the photoresist layer 34 is made of a positive type photoresist material, a hard baking process will be performed instead of the ashing process.

Figure 5D:
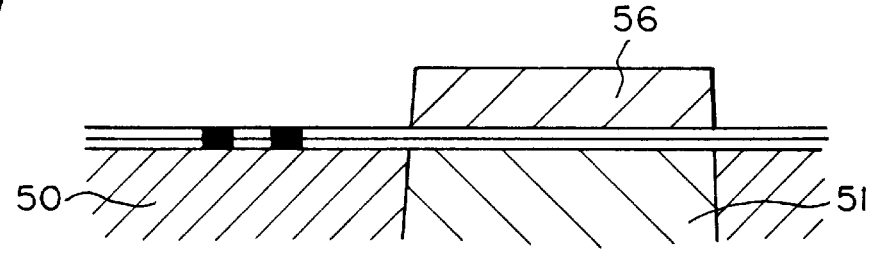
Figure 5E:
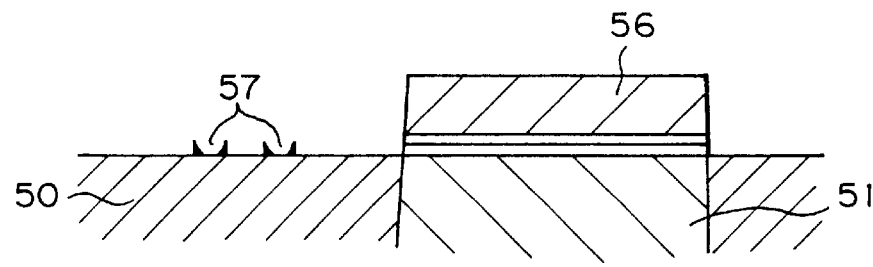

Then, as shown in FIG. 5d, the photoresist layer 54 is removed (step S48). After that, the seed layer of titanium and gold 52 and 53 except for that under the bump cover layers 56 is removed by milling operation (step S49). Thus, as shown in FIG. 5e, a part of the properties-changed portions caused by the laser beam machining will finally remain as an identification mark 57.

Then the wafer is cut in a plurality of rectangular sliced blocks (bars) so that each of the bars includes a plurality of the thin film magnetic head elements aligned in a single-row. Thereafter, one surface of each of the sliced bars is subjected to a grinding process to shape contour such as two rails, and the air bearing surfaces (ABSs) of the rails are subjected to a lapping process to obtain a desired throat height. Then, by performing the similar processes as the conventional manufacturing processes, a separated individual magnetic head can be finally obtained.

FIGS. 7a, 8a, 9a, 10a and 11a show processes of the laser beam machining, and FIGS. 7b, 8b, 9b, 10b and 11b show shapes of finally obtained identification marks, for various laser beam conditions and various photoresist materials, respectively. FIGS. 7a and 7b are a case wherein an ultraviolet laser beam from a gas laser such as a He—Cd laser or an excimer laser is radiated, FIGS. 8a and 8b are a case wherein a relatively low power laser beam from a YAG laser is radiated to a negative type photoresist layer, FIGS. 9a and 9b are a case wherein a medium power laser beam from a YAG laser is radiated to a negative type photoresist layer, FIGS. 10a and 10b are a case wherein a relatively high power laser beam from a YAG laser is radiated to a negative type photoresist layer, and FIGS. 11a and 11b are a case wherein a laser beam from a YAG laser is radiated to a positive type photoresist layer.

As will be understood from these figures, variously shaped identification marks 57 are finally formed depending upon shapes of the holes 54a opened in the photoresist layer 54 by means of the laser beam machining. The identification mark 57 in the case shown in FIG. 7b is substantially constituted by a cylindrical shaped gold plate, the marks 57 in both cases shown in FIGS. 8b and 9b are constituted by properties-changed seed layers with ring shape, and the marks 57 in both cases shown in FIGS. 10b and 11b are constituted by properties-changed seed layers with ring shapes and also by ring-shaped gold plate. All of the identification marks 57 shown in FIGS. 7a and 7b to 11a and 11b can be easily and externally identified. It should be noted that, for the laser beam machining, a solid laser such as the YAG laser can be treated easier than the ultraviolet gas laser which is relatively expensive and difficult for maintenance.

According to the aforementioned process, since the laser beam machining is performed after coating the photoresist layer 54 for the gold plating, dross which is certainly produced by the laser beam machining will be absorbed by this photoresist layer 54 to suppress its scattering. Also, since the produced dross can be removed together with the photoresist layer 54, the electromagnetic transducer elements will be effectively prevented from contamination. Furthermore, the photoresist layer 54 contributes to absorption of heat produced by the laser beam. In addition, since the seed layer of titanium and gold 52 and 53 acts as a layer for laser beam reflection and absorption for laser beam scattering and for heat absorption, the transducer elements and lead conductors formed below this seed layer are protected from destructions caused by metal fusion or boundary face stripping due to the laser beam striking through the protection layer 50 which is in general formed by a material easily transmitting the laser beam.

According to this process, the identification mark 57 can be made in any region outside of the bumps 51. Namely, the identification mark 57 can be made even on the transducer elements and on the lead conductors. Thus, enough amount of identification information can be written even if the thin film magnetic head is greatly downsized. Although it is desired that the identification mark is formed outside of the bumps 51 because input and output wires will be connected thereto, if there are remained areas in the bumps 51 after the connection of the input and output wires, the identification mark may be formed on the remained areas within the bumps 51.

Furthermore, according to the process, since the identification marks are formed on the element-forming face (front surface) of the wafer, these identification marks can be held even if a portion of the wafer near its rear surface is sliced and removed due to downsizing. Therefore, management of each of magnetic heads is possible in any manufacturing processes after the aforementioned bump cover forming process.

Laser beam machining of the identification marks can result usage of no photomask and easy formation of arbitrary marks. For example, a second identification mark representing wafer identifying information such as a location information of the wafer in a lot or a lot number can be easily formed without increasing a number of the photomask. Also, as precise location of the identification marks will not be required, a low cost laser can be used.

To form the identification mark on the protection layer 50 results no modification of process conditions in a protection layer deposition process which may be one of the most difficult manufacturing processes of the thin film magnetic head. Therefore, the formation process of the identification mark can be very easily introduced into the manufacturing processes of the magnetic head.

The identification mark can be represented either by a binary code other than the BCD code or by characters and numerals. If the binary code is used instead of characters and/or numerals, larger amount of the information can be written in a smaller area. Using of the binary code is also effective for making very easy the laser beam machining process of the identification mark because it can be represented by spots.

In the aforementioned process, the identification mark which indicates wafer identifying information is formed by the laser beam machining. However, another identification mark indicating a location of the wafer or indicating for example specification of the head can be formed by the laser beam machining.

FIGS. 12a to 12e illustrate a modified bump cover forming process based upon the process shown in FIG. 4. In these figures, reference numeral 120 denotes a protection layer, 121 denotes bumps, 122 and 123 denote a titanium layer and a gold layer which constitute a seed layer for gold plating, 124 denotes a negative type photoresist layer, 124a denote holes formed by a laser beam machining in the photoresist layer 124, 125 denote laser beams, 126 denotes bump cover layers of gold, and 127 denotes a finally formed identification mark.

Figure 12A:
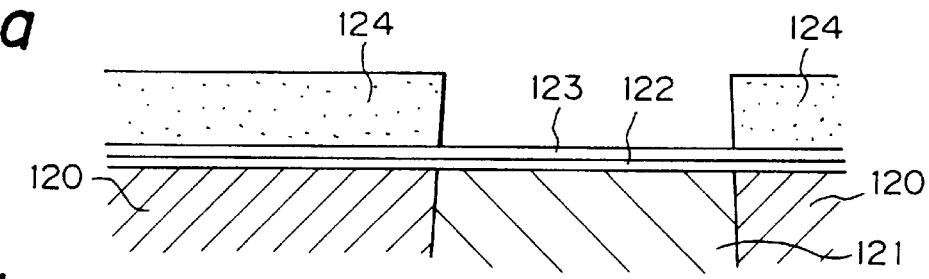
FIGS. 12a to 12e are wafer sectional views illustrating a modified bump cover forming process based upon the process shown in FIG. 4.
Figure 12B:
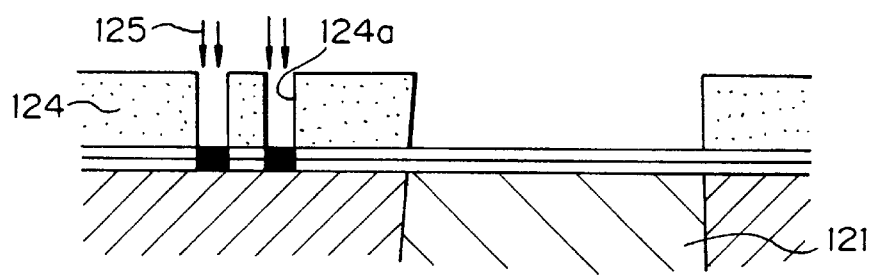
Figure 12C:
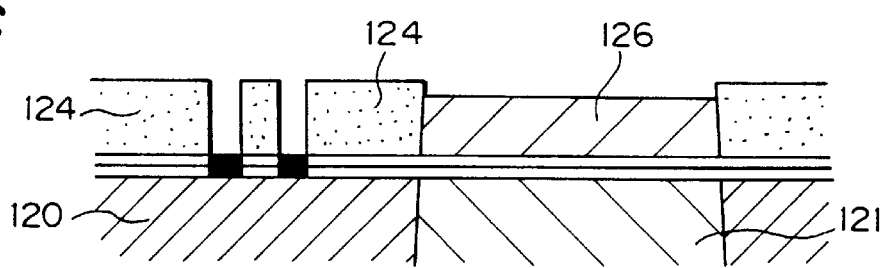
Figure 12D:
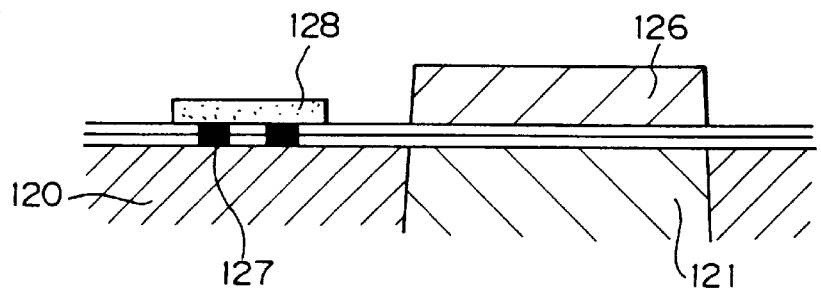
Figure 12E:
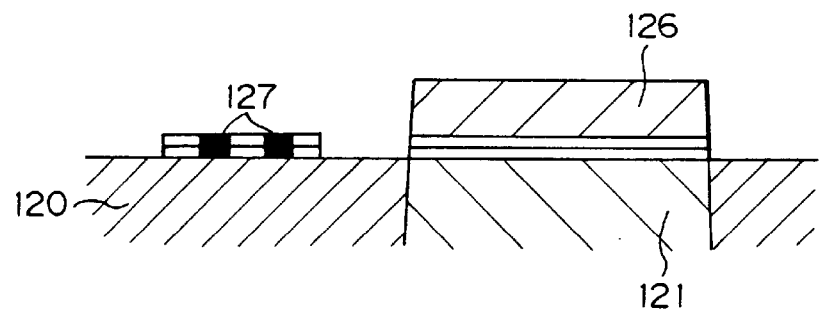

In this modified process, a protection cover 128 shown in FIG. 12d is formed to cover a region of the identification mark 127 after a step of removing the photoresist layer 124 which is the same as the step S48 in the process of FIG. 4. This protection cover 128 serves to protect the identification mark 127 from damage due to milling operation which will be performed for removing the seed layer of titanium and gold 122 and 123 except for that under the bump cover layers 126 as shown in FIG. 12*e*. Operations in another steps in this modified bump cover forming process and advantages therefrom are the same as those in the process of FIG. 4.

FIG. 13 shows an another bump cover forming process of a method of manufacturing a thin film magnetic head according to the present invention, and FIGS. 14*a* to 14*e* sectionally show the process of FIG. 13. In this process, a laser beam machining step is carried out just after a gold plating step. Hereinafter, referring to these figures, the bump cover forming process will be described in detail.

In FIGS. 14*a* to 14*e*, reference numeral 140 denotes a protection layer, 141 denotes bumps, 142 and 143 denote a titanium layer and a gold layer which constitute a seed layer for gold plating, 144 denotes a negative type photoresist layer, 144*a* denote holes formed by a laser beam machining in the photoresist layer 144, 145 denote laser beams, 146 denotes bump cover layers of gold, and 147 denotes a finally formed identification mark.

Operations in steps S130 to S134 in FIG. 13 are the same as those in the steps S40 to S44 in FIG. 4, respectively. After the developing step S134 which provides a layer structure as shown in FIG. 14*a*, the wafer is subjected to a slight ashing process (step S135). As a result, the surface of the seed layer 143 at the regions of the bumps 141 is purified, and then gold plating is performed (step S136). Thus, terminal cover layers (bump cover layers) 146 made of gold are formed as shown in FIG. 14*b*.

Then, the laser beams 145 are radiated to the photoresist layer 144 which is formed on the seed layer except for the regions of the bumps 141, to machine a part of the photoresist layer 144 and the seed layer 142, 143 so that an identification mark such as the second identification mark 35 shown in FIG. 3, which indicates wafer identifying information (for example a location information of the wafer in a lot or a lot number), by a binary code such as a BCD code (step S137). Namely, as shown in FIG. 14*c*, each laser beam 145 makes the hole 144*a* in the photoresist layer 144 and changes properties of the seed layer 142, 143 of a circular portion under the hole 144*a*.

Operations in steps S138 and S139 in FIG. 13 are also the same as those in the steps S48 and S49 in FIG. 4, respectively.

According to the above-mentioned process, since the laser beam machining is performed after the gold plating of the bump cover layers 146 on the bumps 141, dross which is certainly produced by the laser beam machining will produce no effect on this gold plating of the bump covers 146. According to this process, because no plated gold layer is formed in the holes 144*a* in the photoresist layer 144, the finally obtained identification mark 147 has a shape as shown in FIG. 14*e*, which is the same as that shown in FIGS. 8*b* and 9*b*. Operations in another steps in this modified bump cover forming process and advantages therefrom are the same as those in the process of FIG. 4.

FIG. 15 shows a further bump cover forming process of a method of manufacturing a thin film magnetic head according to the present invention, and FIGS. 16*a* to 16*e* sectionally show the process of FIG. 15. In this process, a laser beam machining step is carried out after a photoresist layer removing step. Hereinafter, referring to these figures, the bump cover forming process will be described in detail.

In FIGS. 16*a* to 16*e*, reference numeral 160 denotes a protection layer, 161 denotes bumps, 162 and 163 denote a titanium layer and a gold layer which constitute a seed layer for gold plating, 164 denotes a negative type photoresist layer, 165 denote laser beams, 166 denotes bump cover layers of gold, and 167 denotes a finally formed identification mark.

Figure 16A:
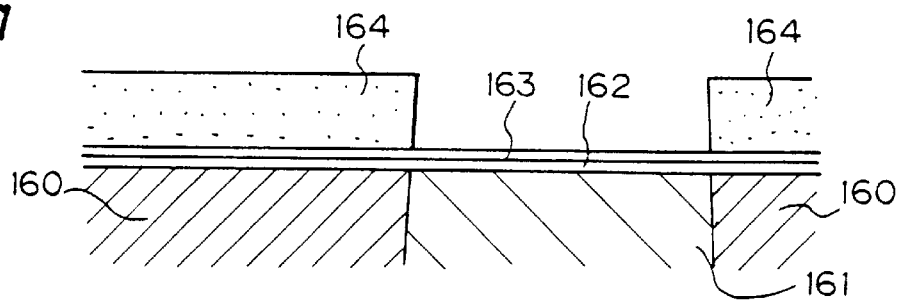
FIGS. 16a to 16e are wafer sectional views illustrating the process of FIG. 15.
Figure 16B:
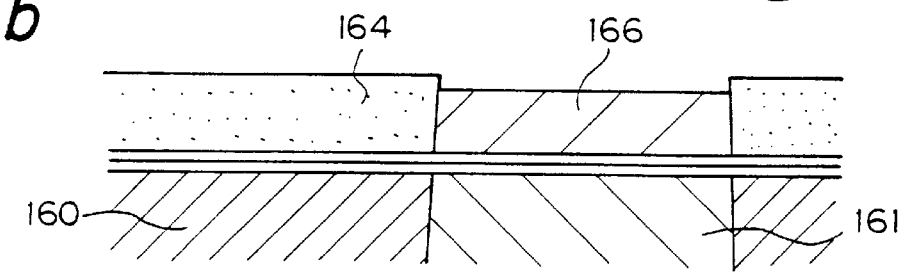

Operations in steps S150 to S154 in FIG. 15 are the same as those in the steps S40 to S44 in FIG. 4, respectively. After the developing step S154 which provides a layer structure as shown in FIG. 16*a*, the wafer is subjected to a slight ashing process (step S155). As a result, the surface of the seed layer 163 at the regions of the bumps 141 is purified, and then gold plating is performed (step S156). Thus, terminal cover layers (bump cover layers) 166 made of gold are formed as shown in FIG. 16*b*.

Figure 16C:
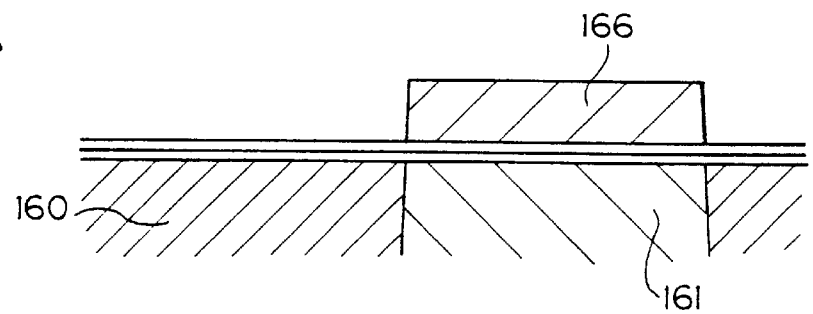
Figure 16D:
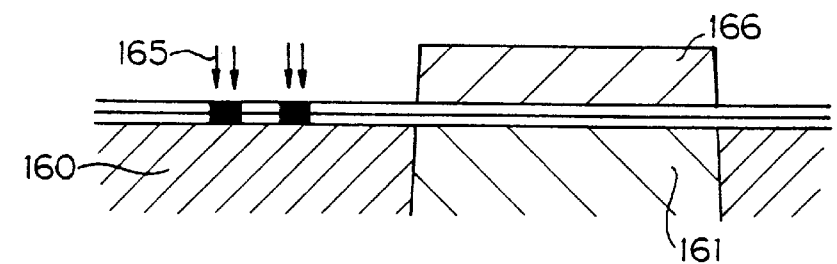

Then, as shown in FIG. 16*c*, the photoresist layer 164 is removed (step S157). After that, the laser beams 165 are radiated to the seed layer except for the regions of the bump cover layers 166, to machine a part of the seed layer 162, 163 so that an identification mark such as the second identification mark 35 shown in FIG. 3, which indicates wafer identifying information (for example a location information of the wafer in a lot or a lot number), by a binary code such as a BCD code (step S158). Namely, as shown in FIG. 16 *d*, each laser beam 165 changes properties of the seed layer 162, 163 of a circular portion.

Figure 16E:
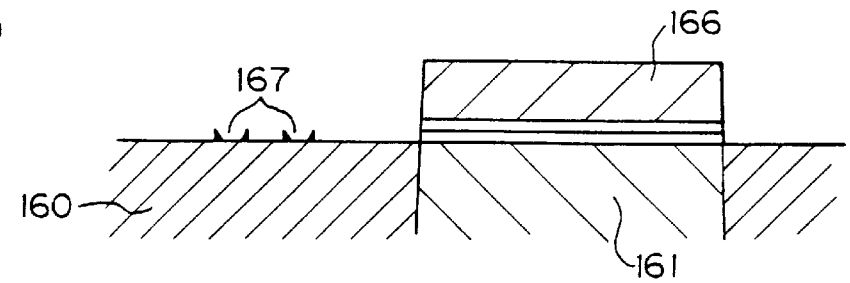

Then, the seed layer of titanium and gold 162 and 163 except for that under the bump cover layers 166 is removed by milling operation (step S159). This milling operation will result to decrease height of the identification mark 167 and to remove scattered dross with low adhesion due to the laser beam machining. Thus, as shown in FIG. 16*e*, a part of the properties-changed portions caused by the laser beam machining and some dross produced by the laser beam machining will finally remain as the identification mark 167.

According to the above-mentioned process, since the laser beam machining is performed after the gold plating of the bump cover layers 166 on the bumps 161, the dross due to the laser beam machining will produce no effect on this gold plating of the bump covers 166. According to this process, because the laser beam is directly radiated to the seed layer and also no gold plating will be carried out after that, the finally obtained identification mark 167 has a shape as shown in FIG. 16*e*, which is the same as that shown in FIGS. 8*b* and 9*b*. However, since the laser beam machining is carried out after the photoresist layer 164 is removed, this process cannot expect the photoresist material to absorb the dross produced by the laser beam machining and heat produced by the laser beam. Operations in another steps in this modified bump cover forming process and advantages therefrom are the same as those in the process of FIG. 4.

Figure 17:
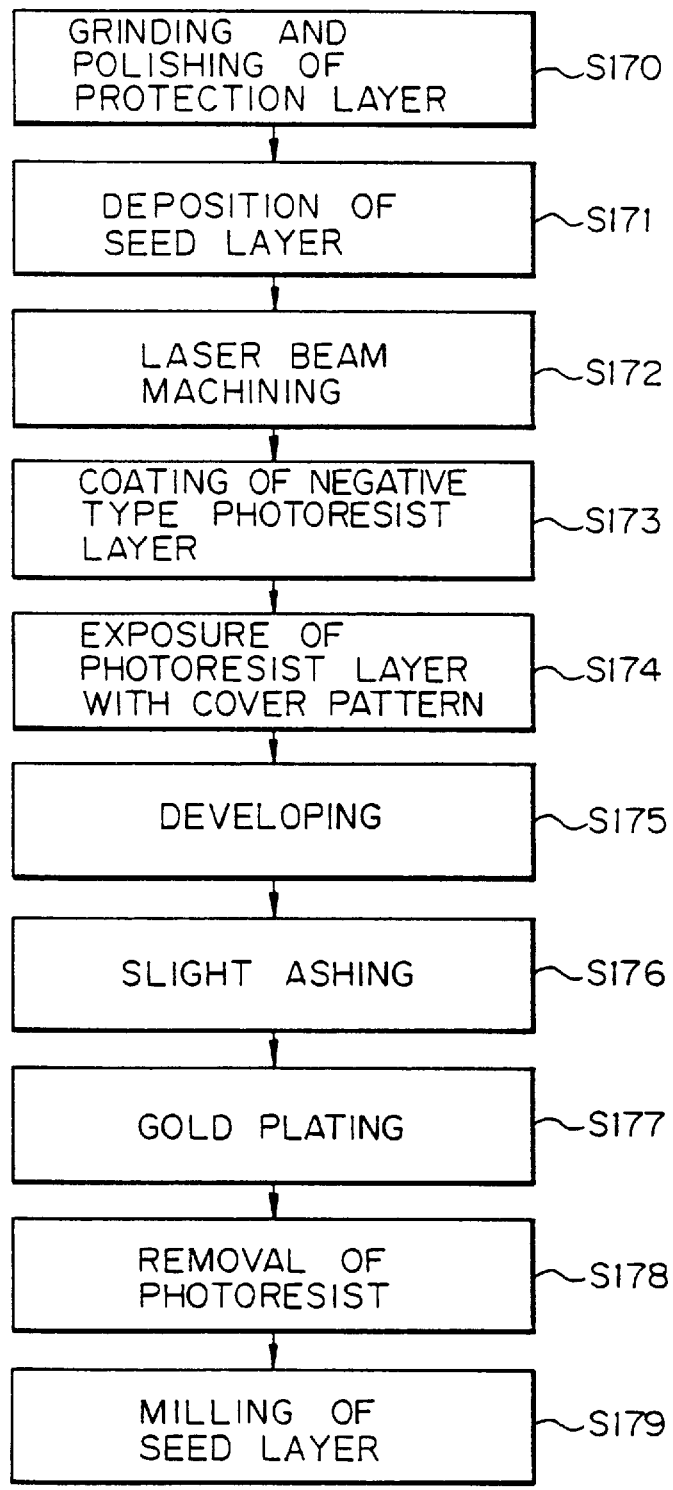
FIG. 17 is a flow chart of a still further bump cover forming process of a method of manufacturing a thin film magnetic head according to the present invention.

FIG. 17 shows a still further bump cover forming process of a method of manufacturing a thin film magnetic head according to the present invention, and FIGS. 18*a* to 18*e* sectionally show the process of FIG. 17. In this process, a laser beam machining step is carried out before a photoresist layer coating step. Hereinafter, referring to these figures, the bump cover forming process will be described in detail.

In FIGS. 18*a* to 18*e*, reference numeral 180 denotes a protection layer, 181 denotes bumps, 182 and 183 denote a titanium layer and a gold layer which constitute a seed layer for gold plating, 184 denotes a negative type photoresist layer, 185 denote laser beams, 186 denotes bump cover layers of gold, and 187 denotes a finally formed identification mark.

Figure 18A:
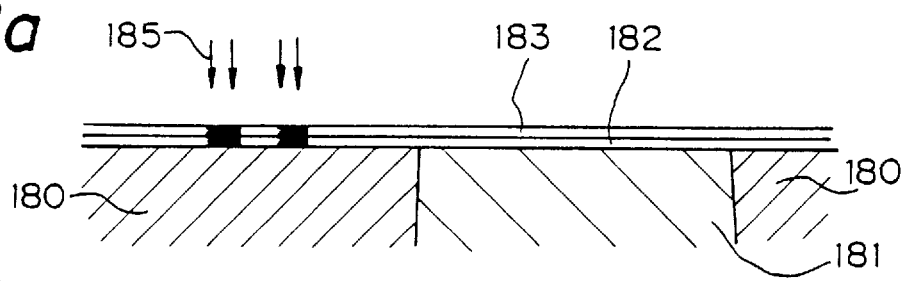
FIGS. 18a to 18e are wafer sectional views illustrating the process of FIG. 17.
Figure 18B:
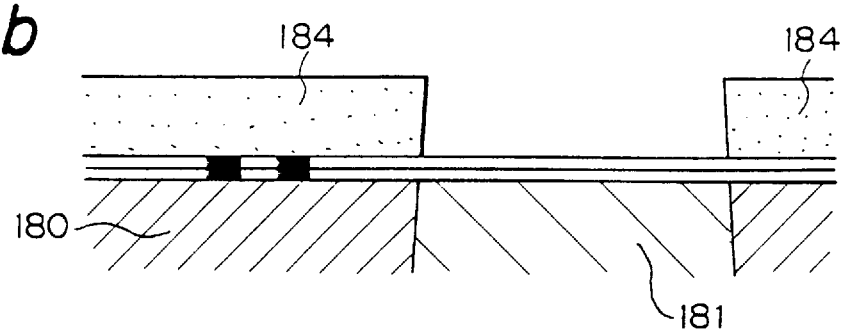
Figure 18C:
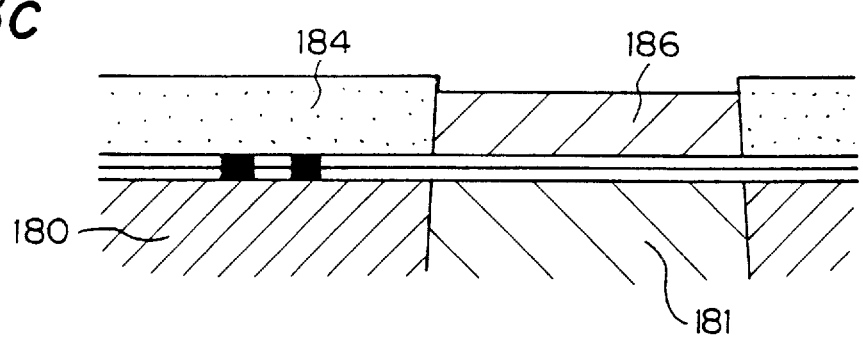
Figure 18D:
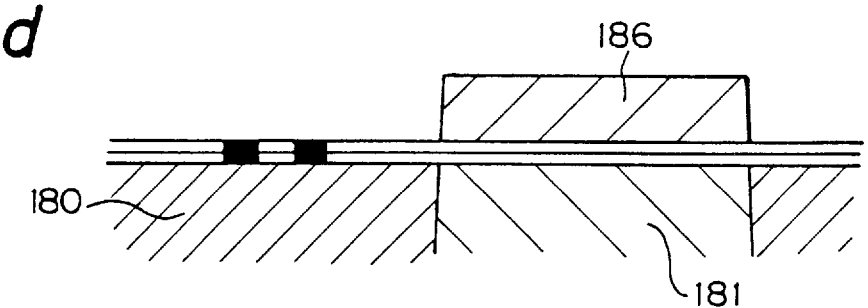

Operations in steps S170 and S171 in FIG. 17 are the same as those in the steps S40 and S41 in FIG. 4, respectively. After the sputtering step S171 which forms the seed layer of the titanium layer 182 and the gold layer 183, the wafer is subjected to a laser beam machining process (step S172). At this step S172, the laser beams 185 are radiated to the seed layer except for the regions of the bumps 181, to machine a part of the seed layer 182, 183 so that an identification mark such as the second identification mark 35 shown in FIG. 3, which indicates wafer identifying information (for example a location information of the wafer in a lot or a lot number), by a binary code such as a BCD code. Namely, as shown in FIG. 18a, each laser beam 185 changes properties of the seed layer 182, 183 of a circular portion.

Operations in steps S173 to S179 in FIG. 17 are also the same as those in the steps S42 to S49 other than the laser beam machining step S45 in FIG. 4, respectively.

The seed layer of titanium and gold 182 and 183 except for that under the bump cover layers 186 is removed by the milling operation at the step S179 resulting to decrease height of the identification mark 187 and to remove scattered dross with low adhesion due to the laser beam machining. Thus, as shown in FIG. 18e, a part of the properties-changed portions caused by the laser beam machining and some dross produced by the laser beam machining will finally remain as the identification mark 187.

Figure 18E:
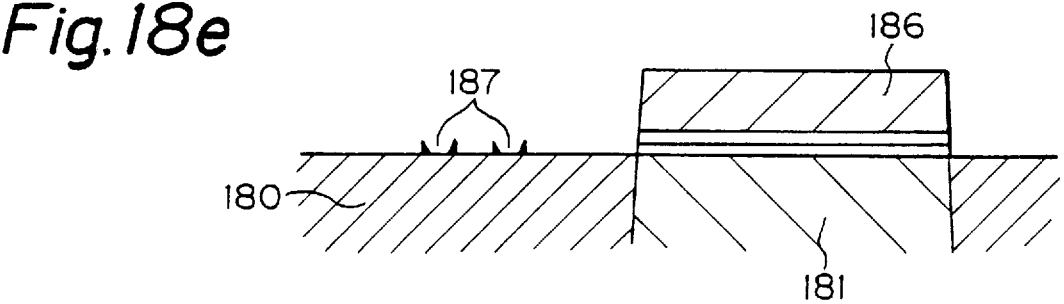

According to this process, because the laser beam is directly radiated to the seed layer and also the gold plating is carried out after that, the finally obtained identification mark 187 has a shape as shown in FIG. 18e, which is the same as that shown in FIGS. 8b and 9b. However, since the laser beam machining is carried out before the photoresist layer 184 is formed, this process cannot expect the photoresist material to absorb the dross produced by the laser beam machining and heat produced by the laser beam. Operations in another steps in this modified bump cover forming process and advantages therefrom are the same as those in the process of FIG. 4.

Figure 19:
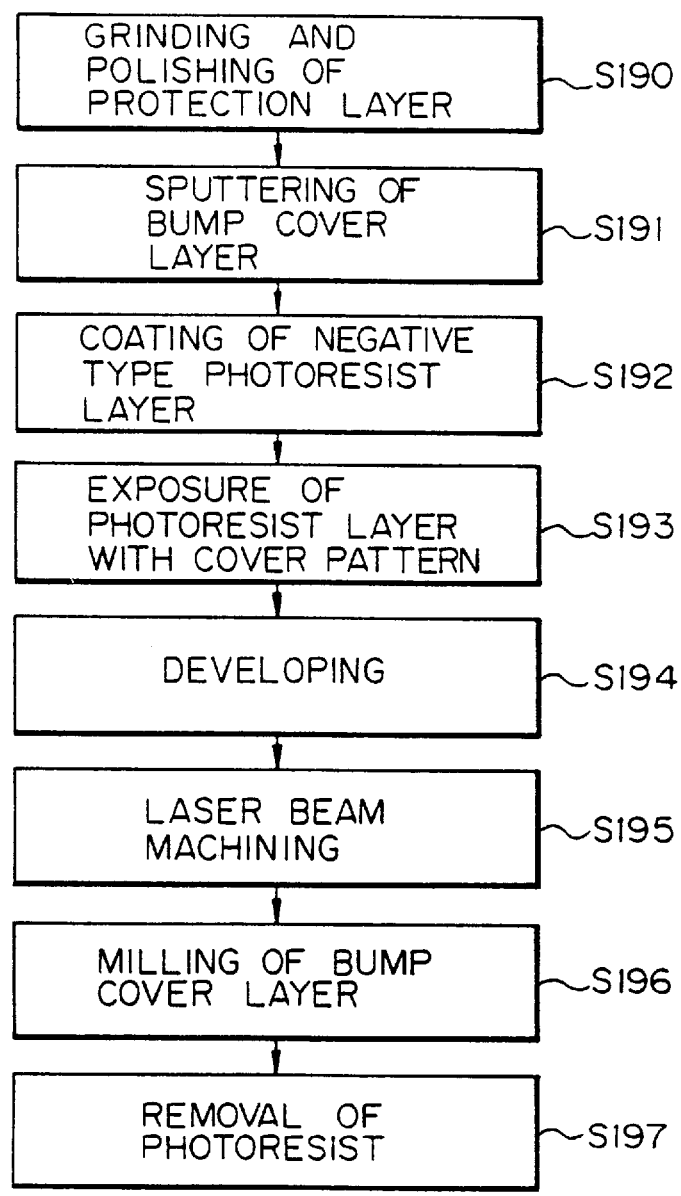
FIG. 19 is a flow chart of an another bump cover forming process of a method of manufacturing a thin film magnetic head according to the present invention.

FIG. 19 shows an another bump cover forming process of a method of manufacturing a thin film magnetic head according to the present invention, and FIGS. 20a to 20e sectionally show the process of FIG. 19. In this process, bump cover layers are formed by sputtering instead of plating. Hereinafter, referring to these figures, the bump cover forming process will be described in detail.

On a front surface (element-forming face) of a wafer, a plurality of electromagnetic transducers, a plurality of bumps made of for example copper, and a plurality of lead conductors electrically connecting the transducers with the respective bumps, such as shown in FIG. 3 are formed and after that a protection layer is formed thereon, in accordance with the known processes.

In the bump cover forming process carried out after these processes, at first, the protection layer 200 is ground and polished to bare a surface of the bumps 201 (step S190).

Then, a titanium layer 201 and a gold layer 203 which constitute a bump cover layer are sequentially deposited on the ground protection layer 200 and on the bared bumps 201 by sputtering (step S191). Thicknesses of the deposited titanium layer 202 and the deposited gold layer 203 are for example 50 Angstroms and 1 μm, respectively. The titanium layer 202 serves as an adhesive layer which may be made by chrome or tantalum other than titanium.

Figure 20A:
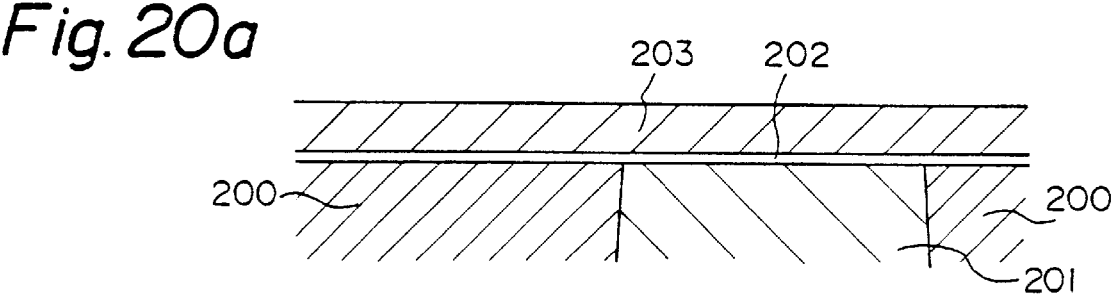
FIGS. 20a to 20e are wafer sectional views illustrating the process of FIG. 19.
Figure 20B:
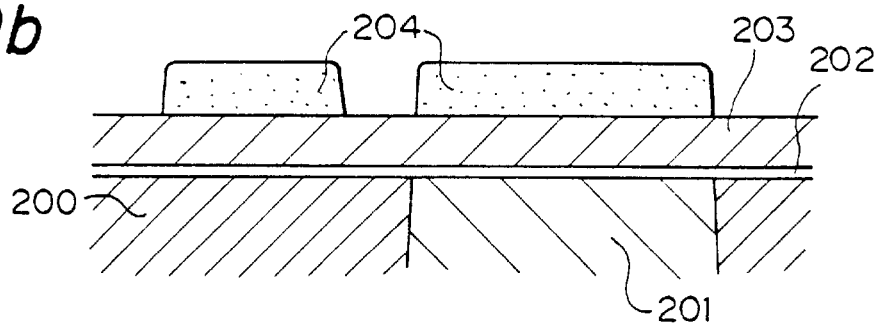

On the bump cover layer 203, a negative type photoresist layer 204 is coated (step S192). This coated photoresist layer 204 is then exposed to for example ultraviolet radiation with a mask having a predetermined bump cover pattern and a predetermined mark forming region pattern (step S193) and developed (step S194) so as to obtain a layer structure as shown in FIG. 20b.

Figure 20C:
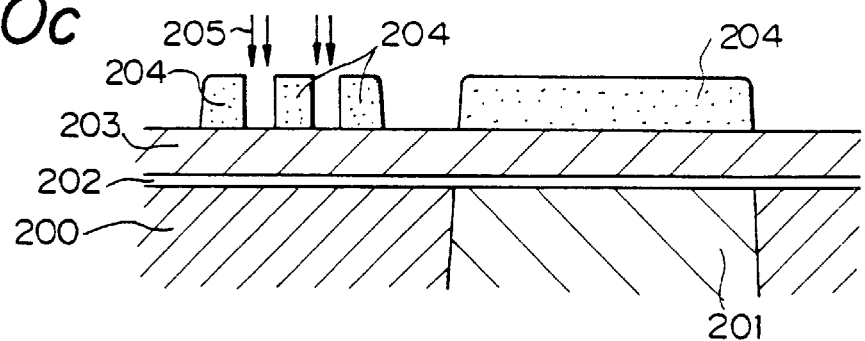

Then, laser beams 205 are radiated to the photoresist layer 204 which is formed on the bump cover layer except for the regions of the bumps 201 and for the mark forming region, to machine a part of the photoresist layer 204 so that an identification mark such as the second identification mark 35 shown in FIG. 3, which indicates wafer identifying information (for example a location information of the wafer in a lot or a lot number), by a binary code such as a BCD code (step S195). Namely, as shown in FIG. 20c, the laser beam 205 draws a negative pattern of the identification mark on the photoresist layer 204 so that only portions of the photoresist layer 204 corresponding to the mark are remained. During this machining, the bump cover layer (203 and 202) with a thickness near the laser wave length will act as a reflection layer of the laser beam.

Figure 20D:
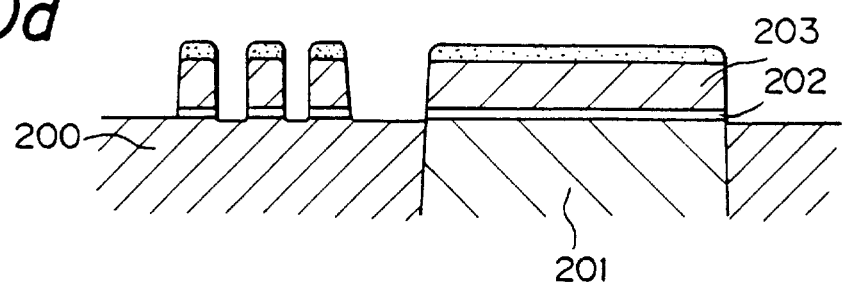
Figure 20E:
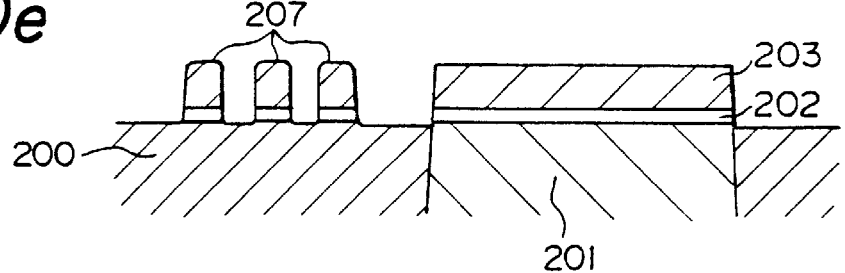

After the laser beam machining process, the wafer is subjected to a milling process (step S196). Thus, the bump cover layer (202 and 203) in regions with no photoresist layer 204 is eliminated. As a result, the bump cover layers of gold are formed at the regions of the bumps 201 and the identification mark made of the gold bump cover layer is formed as shown in FIG. 20d. Then, all the remained photoresist layer 204 is removed (step S197) and thus the gold bump cover layers (202 and 203) and the identification mark 207 are finally obtained as shown in FIG. 20e.

According to the aforementioned process, since the laser beam machining is performed after forming the bump cover layer, dross which is certainly produced by the laser beam machining will be absorbed by this bump cover layer to suppress its scattering. Also, the bump cover layer contributes to absorption of heat produced by the laser beam. Namely, since the bump cover layer acts as a layer for laser beam reflection and absorption, for laser beam scattering and for heat absorption, the transducer elements and lead conductors formed below this cover layer are protected from destructions caused by metal fusion or boundary face stripping due to the laser beam striking through the protection layer 200 which is in general formed by a material easily transmitting the laser beam. The finally obtained identification mark 207 has a shape as shown in FIG. 20e, which is the same as that shown in FIG. 7b. Operations in another steps in this modified bump cover forming process and advantages therefrom are the same as those in the process of FIG. 4.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of manufacturing thin film magnetic heads, comprising the steps of:

forming, on one surface of a substrate, a plurality of electromagnetic transducer elements and a plurality of input and output terminals electrically connected to said transducer elements;

forming a protection layer on said surface of the substrate to cover at least said transducer elements;

forming terminal cover layers and a seed layer thereof on said surface in order to cover said input and output terminals, respectively; and forming identification marks for identifying said respective magnetic head, on said protection layer on said surface of the substrate by laser beam machining, said identification mark forming step being performed during said terminal cover layer forming step.

2. The method as claimed in claim 1, wherein said identification mark forming step includes a step of forming identifying information which is different in each substrate by laser beam machining.

3. The method as claimed in claim 1, wherein said terminal cover layer forming step includes a step of forming a gold cover layer on said protection layer by sputtering, and a step of making a predetermined patterns of said gold cover layer, and wherein said identification mark forming step includes a step of forming identification marks on said patterned gold cover layer by laser beam machining.

4. The method as claimed in claim 1, wherein said identification mark forming step includes a step of forming said identification marks in regions outside of said input and output terminals.

5. The method as claimed in claim 1, wherein said terminal cover layer forming step includes a step of forming the seed layer on said protection layer, and a step of plating gold on said seed layer to make the terminal cover layers, and wherein said identification mark forming step includes a step of forming identification marks on said seed layer by laser beam machining.

6. The method as claimed in claim 5, wherein said method further comprises a step of forming a photoresist layer used for plating gold to make said terminal cover layers, and wherein said identification mark forming step includes a step of applying laser beam to said seed layer through said photoresist layer.

7. The method as claimed in claim 6, wherein said identification mark forming step is carried out after said gold plating step.

8. The method as claimed in claim 6, wherein said identification mark forming step is carried out before said gold plating step.

9. The method as claimed in claim 6, wherein said method further comprises a step of removing said photoresist layer, and wherein said identification mark forming step is carried out after said photoresist layer removing step.

10. The method as claimed in claim 6, wherein said identification mark forming step is carried out before said photoresist layer forming step.

* * * * *